(12) United States Patent  
Miller

(10) Patent No.: US 9,151,182 B2
(45) Date of Patent: Oct. 6, 2015

(54) SYSTEM AND METHOD FOR REMOVING HEAT FROM A TURBOMACHINE

(75) Inventor: Harold Edward Miller, Glenville, NY (US)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 13/092,241

(22) Filed: Apr. 22, 2011

(65) Prior Publication Data

US 2012/0266601 A1 Oct. 25, 2012

(51) Int. Cl.
*F01D 25/26* (2006.01)
*F01D 25/14* (2006.01)

(52) U.S. Cl.
CPC ............... *F01D 25/26* (2013.01); *F01D 25/14* (2013.01); *F05D 2260/221* (2013.01)

(58) Field of Classification Search
CPC .... F01D 25/25; F01D 25/14; F05D 2260/221
USPC .......... 60/772, 782, 39.01, 785, 39.83, 226.1, 60/266, 728, 806, 262, 795
See application file for complete search history.

(56) References Cited

U.S. PATENT DOCUMENTS

| | | | |
|---|---|---|---|
| 5,172,553 A | 12/1992 | Barton et al. | |
| 6,341,937 B1 | 1/2002 | Magoshi et al. | |
| 6,478,534 B2 | 11/2002 | Bangert et al. | |
| 7,299,618 B2 | 11/2007 | Terazaki et al. | |
| 7,798,767 B2 | 9/2010 | Kondo et al. | |
| 8,061,971 B2 | 11/2011 | Roush et al. | |
| 8,083,495 B2 * | 12/2011 | Whaling et al. | 417/189 |
| 2005/0163612 A1 | 7/2005 | Reigl | |
| 2008/0271459 A1 * | 11/2008 | Vedhagiri et al. | 60/772 |
| 2010/0040482 A1 * | 2/2010 | Whaling et al. | 417/198 |
| 2010/0096474 A1 * | 4/2010 | Zhang et al. | 239/265.17 |

FOREIGN PATENT DOCUMENTS

| | | |
|---|---|---|
| CN | 1294251 A | 5/2001 |
| CN | 1626877 A | 6/2005 |
| CN | 101709673 A | 5/2010 |
| JP | 5288007 A | 11/1993 |
| WO | 2008028792 A1 | 3/2008 |

OTHER PUBLICATIONS

Unofficial English Translation of Chinese Office Action issued in connection with corresponding CN Application No. 201210133247.1 on Dec. 11, 2014.
US 7,926,255, 04/2011, Iwasaki et al. (withdrawn)

* cited by examiner

*Primary Examiner* — Phutthiwat Wongwian
*Assistant Examiner* — Vikansha Dwivedi
(74) *Attorney, Agent, or Firm* — Ernest G. Cusick; Frank A. Landgraff

(57) ABSTRACT

The present invention provides systems and methods of removing heat from internal areas of a turbomachine. Embodiments of the present invention may incorporate a suction device and a control system. Operatively, these elements may collectively discharge remnants of a heated fluid and/or gas from those internal areas.

17 Claims, 4 Drawing Sheets

SYSTEM AND METHOD FOR REMOVING HEAT FROM A TURBOMACHINE

BACKGROUND OF THE INVENTION

The present application relates generally to the heat generated by a turbomachine; and more particularly to, a system and method for removing the heat remaining within a gas turbine and a combustion process has ended.

As a gas turbine operates, a combustion process heats various components. When the combustion process ends, these hot components heat the fluids remaining inside the gas turbine. Within the casing, the heated fluids have a density that is less than fluids at a lower temperature. The hotter fluids rise and cause a temperature gradient that leads to an upper casing at a higher temperature than a lower casing; and a hotter rotor at a 12:00 position than at a 6:00 position. This behavior can cause both the rotor and the casing to bow; possibility reducing the clearances between these components, which are formed of different materials.

There may be a few issues with the currently known systems and methods that address these issues. One solution slowly rotates the rotor. This process may yield relatively uniform temperatures at the 12:00 and 6:00 positions. However, this solution does not reduce bowing in the casing.

Another solution rotates the rotor at a faster speed, such as a crank speed, purge speed, or the like. This process forces cooling air across the rotor and the casing. This operation consumes a considerable amount of energy to spin the rotor and to maintain adequate lubrication of the rotor, bearings and other related components.

Another solution uses an external valve located on the upper casing. Here, an external air supply is forced into the casing via the external valve, as the rotor is rotated. This solution forces cooler air, at a high velocity, in a manner that impinges the hot components. This may cause increased thermal stress on those components.

For the foregoing reasons, there is a desire for a method and system that removes the heated fluid from the internal flow paths of a gas turbine. The system should not use a valve to force air into the internal flow paths, in a manner that causes the high velocity impingement.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment of the present invention, a system comprising: a casing which encloses a rotating body that is rotated by a working fluid; wherein the casing comprises an upper half that covers an upper portion of the rotating body, and a lower half that covers a lower portion of the rotating body; a heat removal system that comprises a suction device and a discharge duct, wherein a first end of the discharge duct is connected to the upper half of the casing and a second end of the discharge duct is connected to the suction device; a flow path located between portions of the casing and the rotating body, wherein the working fluid flows within the flow path which engages the discharge duct; and wherein after a combustion process ends, the suction device draws the residual working fluid out of the casing.

In accordance with a first embodiment of the present invention, a method comprising: providing a gas turbine comprising: an inlet section comprising components which receive an airstream; a compressor section and a turbine section, which are mounted on a rotor, wherein rotating components of the compressor section and turbine section are mounted on a periphery of the rotor; a combustion section comprising components which combusts a fuel and the airstream to create a working fluid that rotates the rotor; and a casing that covers the rotor, wherein the casing comprises an upper half that encloses an upper portion of the rotor, and a lower half that encloses a lower portion of the rotor; a flow path located between the casing and the rotor, wherein the working fluid flows through the flow path; providing a heat removal system that comprises a suction device and a discharge duct, wherein a first end of the discharge duct is connected to the upper half of the casing and engages the flow path, and a second end of the discharge duct is connected to the suction device; providing a control system comprising a processor that performs the steps of: determining whether a combustion process is extinguished; determining whether a speed of the rotor is within a range; operating the suction device to draw residual working fluid out of the flow path via the discharge duct.

In accordance with a first embodiment of the present invention, a system comprising: a casing which encloses a rotating body that is rotated by a working fluid; wherein the casing comprises an upper half that covers an upper portion of the rotating body, and a lower half that covers a lower portion of the rotating body; a heat removal system that comprises a suction device integrated with the upper half of the casing; a flow path located between portions of the casing and the rotating body, wherein the working fluid flows within the flow path which engages the discharge duct; and wherein after a combustion process ends, the suction device draws residual working fluid out of the casing.

BRIEF DESCRIPTION OF THE DRAWING

These and other features, aspects, and advantages of the present invention may become better understood when the following detailed description is read with reference to the accompanying figures (FIGS) in which like characters represent like elements/parts throughout the FIGS.

DETAILED DESCRIPTION OF THE INVENTION

Figure 1:
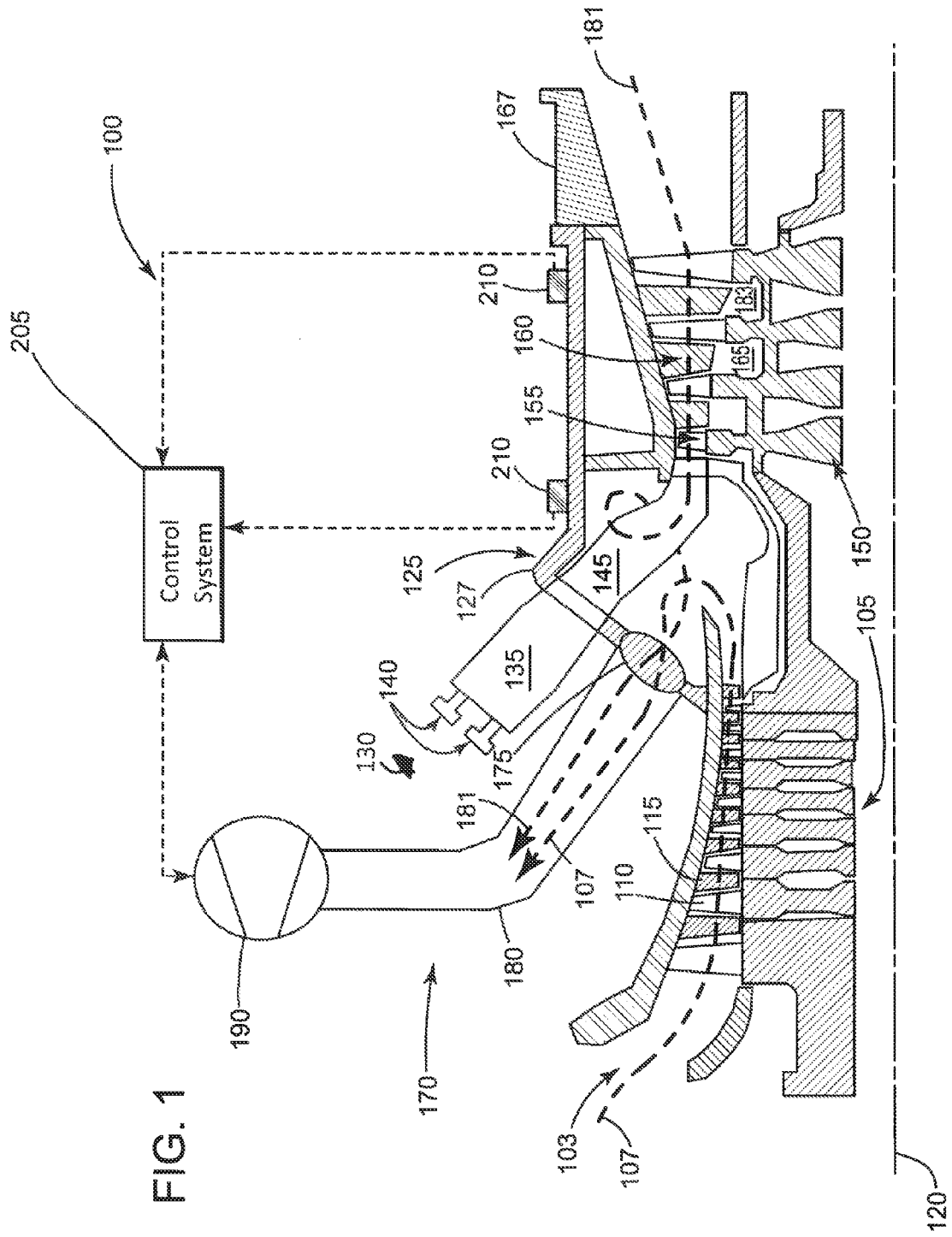
FIG. 1 is a schematic view, in partial cross-section, of a gas turbine, illustrating an embodiment of the present invention.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

The present invention may be applied to a variety of air-ingesting turbomachines. This may include, but is not limiting to, heavy-duty gas turbines, aero-derivatives, or the like. Although the following discussion relates to the gas turbine illustrated in FIG. 1, embodiments of the present invention may be applied to a gas turbine with a different configuration. For example, but not limiting of, the present invention may apply to a gas turbine with different, or additional, components than those illustrated in FIG. 1.

Referring now to the FIGS, where the various numbers represent like components throughout the several views, FIG. 1 is a schematic view, in partial cross-section, of a gas turbine 100, illustrating an embodiment of the present invention. In FIG. 1, a gas turbine 100 includes: a compressor section 105; a combustion section 130; and a turbine section 150; all of which are encapsulated by at least one casing 125. References to "upstream" and the "downstream" hereinafter are based on the direction of the air flowing into the compressor section 105 and the direction of the working fluid flowing in the turbine section 150.

Generally, the compressor section 105 includes a plurality of rotating blades 110 and stationary vanes 115 structured to compress a fluid. The compressor section 105 may also include an extraction port 185. An inlet 103 channels an ambient air (not illustrated), towards the compressor section 105, where the air is compressed (hereinafter "compressed air", or the like).

A combustor section 130 generally includes a plurality of combustion cans 135, a plurality of fuel nozzles 140, and a plurality of transition sections 145. The combustion cans 135 may be equally spaced in the circumferential direction of the rotor 120. The combustion cans 135 may be coupled to a fuel source, which is not illustrated. Each combustion can 135 mixes the compressed air, received from the compressor section 105, with a fuel received from the fuel source. The compressed air and fuel mixture is ignited; a by-product of which may be considered a working fluid, which is not illustrated. The working fluid may be considered a gaseous fluid with high temperature and high pressure properties.

The annular region between the inside area of the casing 125 and the outer area of the combustion and turbine sections 130, 150, may define the flow path 183. The working fluid generally flows within the flow path 183.

The turbine section 150 may include a plurality of rotating components 155; a plurality of stationary components 160, which include nozzles and diaphragms; and a plurality of wheelspace areas 165. The rotating components 155 and the stationary components 160 are installed alternatively in the axial direction. The turbine section 150 converts the working fluid to a mechanical torque.

The gas turbine 100 also comprises a rotor 120, which may be considered a rotating body. Mounted around the periphery of the rotor 120 are the rotating blades 110 of the compressor section 105; and the rotating components 155 of the turbine section 150. The casing 125 has stationary vanes 115 of the compressor section 105 installed alternately with the rotating blades 110 in the axial direction of the rotor 120; and stationary components 160 installed alternately with the rotating components 155 in the axial direction of the rotor 120. The working fluid, while flowing within the flow path 183, engages the rotating and stationary components 155, 160 of the turbine section 150, causing the rotor 120 to rotate. The heat associated with the combustion process, and the working fluid, causes the interior of the casing 125 and the rotor 120 to experience high temperatures, as described.

An embodiment of the gas turbine 100 may comprise multiple casings 125, such as, but not limiting of: a compressor casing, a compressor discharge casing, a turbine casing, an exhaust duct 167, or the like. The casing 125 comprises an upper portion 127 and a lower portion (not illustrated). As known in the art, the upper portion 127 and the lower portion may be symmetrically similar; covering respective portions of the rotor 120. The upper portion 127 covers, or encloses, the upper portion of the rotor 120; and the lower portion covers, or encloses, the lower portion of the rotor 120.

In an embodiment of the present invention, a discharge system 170 is integrated with the upper portion 127. The discharge system 170 is designed to remove the residual working fluid 181; which may present in a flow path 183 after operation of the gas turbine 100 has stopped.

Embodiments of the present invention provide a discharge system 170 for removing the excess heat present in the flow path 183 after the combustion process has ended. A first embodiment of the discharge system 170 may comprise: a discharge port 175; a discharge duct 180; and a suction device 190.

The discharge port 175 allows the residual working fluid 181, and/or the compressed airstream, to exit the gas turbine 100 via the casing 125. The discharge port 175 may be located on an external surface along an outer periphery of the casing 125. The discharge port 175 may have the form of an opening that extends into the internal region of the casing 125. An embodiment of the discharge port 175 may have two operating positions. An open position that allows the residual working fluid 181 to exit from the casing 125; which may be used when discharge system 170 is in use. A closed position that allows the working fluid to remain within the casing 125; which may be used when the gas turbine 100 is in normal operation. The shape of the discharge port 175 may include, but is not limited to: circular, square, rectangular, or the like.

The discharge duct 180 channels the residual working fluid 181 exiting the casing 125 towards the suction device 190. A first end of the discharge duct 180 may be connected to an exterior surface on the discharge port 175. The first end may comprise a shape that allows mating with the discharge port 175. A second end of the discharge duct 180 may be connected to an inlet of the suction device 190. The second end may comprise a shape that allows mating with an inlet of the suction device 190. The form of the discharge duct 180 may include, but is not limited to: ducting, piping, or any other structure capable of channeling the residual working fluid 181 to the suction device 190.

The suction device 190 forcibly draws the residual working fluid 181 out of the casing 125. The form of the suction device 190 may include, but is not limited to: a fan, blower, or other similar device. The suction device 190 comprises an inlet port that receives the residual working fluid 181 from the discharge duct 180. The suction device 190 may also comprise an outlet port that discharges the residual working fluid 181 to a venting system, atmosphere, etc. The form of the suction device 190 may include, but is not limited to: a fan, a blower, a vacuum, or the like.

A control system 205 may operatively control the operation of the discharge system 170. A first embodiment of the control system 205 may incorporate an open-loop controls philosophy. Here, the control system 205 may open the discharge port 175 and start the suction device 190. The suction device 190 may continue to operator until the suction device 190 is stopped.

A second embodiment of the control system 205 may incorporate a closed-loop controls philosophy. Here, the control system 205 may receive data related to the temperature of the casing 125. This data may derive from a temperature detector 210 mounted on, within, or near the gas turbine 100. The data provide by temperature detector 210 may directly, or indirectly, related to: a temperature in the wheelspace area 165; a temperature measured on a surface of the casing 125; a temperature of the residual working fluid 181 discharged from the flow path 183; a temperature derived from the chemical properties of the residual working fluid 181. The form of the temperature detector 210 may include, but is not limited to: a thermocouple; a RTD; or a gaseous fluid analyzer.

Operationally, the control system 205 may open the discharge port 175 and start the suction device 190. The suction device 190 draws the residual working fluid 181 out of the flow path 183 and the airstream out the compressor section 130, as illustrated in FIG. 1. The control system 205 may receive data from the temperature detector 210. Next, the control system 205 may stop the suction device 190 when a monitored temperature that relates to the temperature of the casing 125 is within a desired range.

Figure 2:
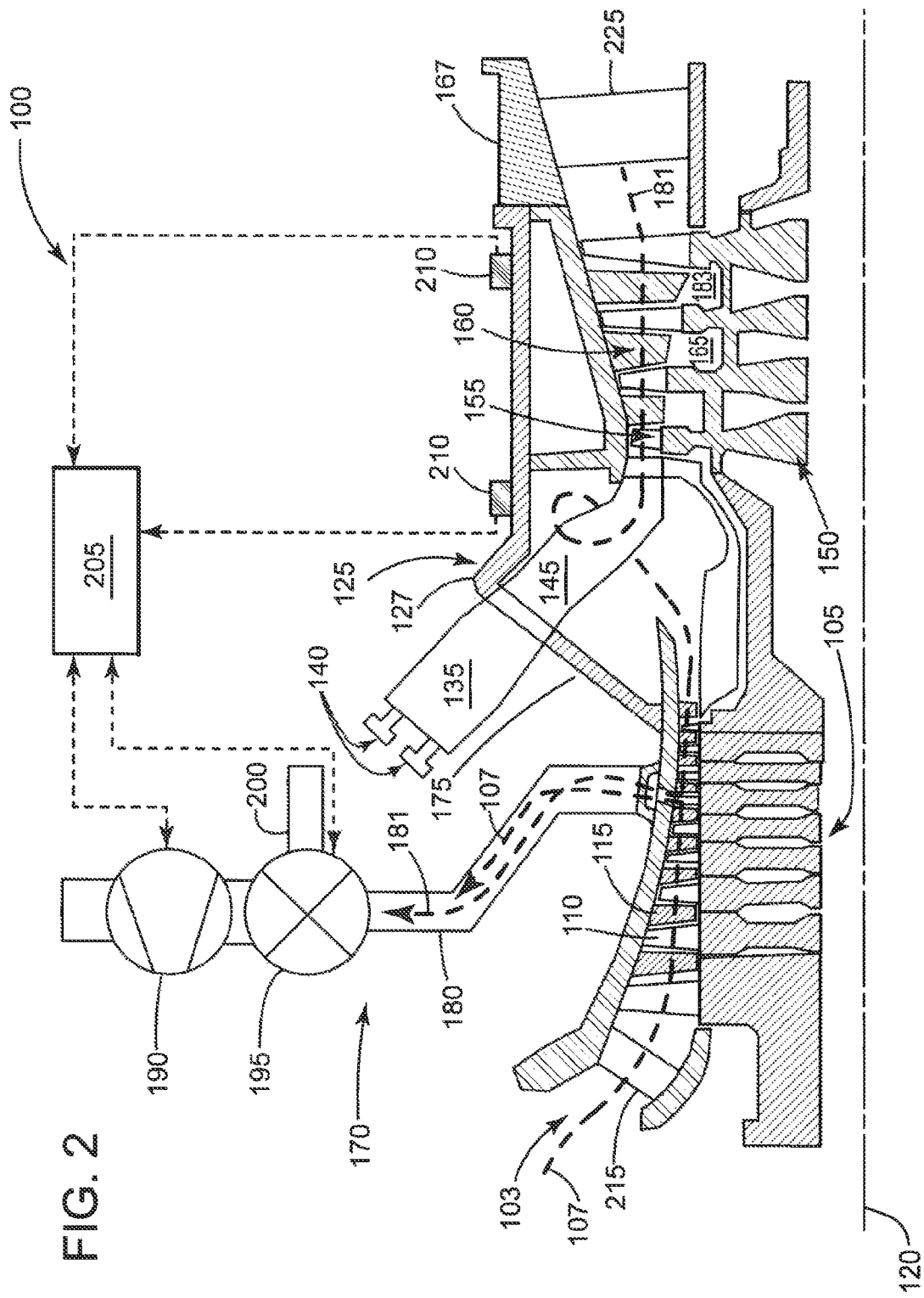
FIG. 2 is a schematic view, in partial cross-section, of a gas turbine, illustrating an alternate embodiment of the present invention.

FIG. 2 is a schematic view, in partial cross-section, of a gas turbine 100, in accordance with an alternate embodiment of the present invention. The gas turbine 100 illustrated in FIG. 2 may be similar to the configuration of FIG. 1. The primary difference between the embodiments illustrated in FIGS. 1 and 2 is the discharge system 170. Therefore, the following discussion on FIG. 2 will be limited to those differences.

The gas turbine 100 may further comprise an extraction port 185, commonly used to remove some of the compressed airstream for operational purposes. In this second embodiment of the present invention, the discharge duct 180 is connected to the extraction port 185. Here, the extraction port 185 serves the purpose of the discharge port 175 discussed in relation to FIG. 1. As illustrated in FIG. 2, the flow path 183 may extend into the aft portion of the compressor section 105.

A multi-port valve 195, such as, but not limiting of, a two-way valve, may be installed between the extraction port 185 and the inlet of the suction device 190. Operationally, the multi-port valve 195 may comprise at least two positions. A first position may allow the extracted compressed air to flow through a vent 200. The first position may be used while the gas turbine 100 is in operation. The second position may allow the residual working fluid 181 to flow to the inlet of the suction device 190. In some configurations of the gas turbine 100, the residual working fluid 100 may mix with the air naturally entering the compressor section 105; this air may be considered the "compressor entering airstream 107". The second position may be used when the gas turbine 100 is not in operation and the discharge system 170 is in operation.

As discussed, the control system 205 may operatively control the operation of the discharge system 170. A first embodiment of the control system 205 may incorporate an open-loop controls philosophy. Here, the control system 205 may position the multi-port valve 195 to allow the working fluid 181 to flow into the discharge duct 180 via the extraction port 185; and start the suction device 190. The suction device 190 may continue to operator until the suction device 190 is stopped.

A second embodiment of the control system 205 may incorporate a closed-loop controls philosophy. Here, the control system 205 may receive data related to the temperature of the casing 125. This data may derive from a temperature detector 210 mounted on, within, or near the gas turbine 100, as described.

Operationally, the control system 205 may position the multi-port valve 195 and start the suction device 190. The suction device 190 draws the residual working fluid 181 out of the flow path 183 and the airstream out the compressor section 130, as illustrated in FIG. 2. The control system 205 may receive data from the temperature detector 210. Next, the control system 205 may stop the suction device 190 when a monitored temperature that relates to the temperature of the casing 125 is within a desired range.

Another alternate embodiment of the present invention may comprise using an airstream restrictor 215 (as illustrated in FIG. 2), in conjunction with the discharge system 170. When, the gas turbine 100 is shutdown, the temperature of the compressor entering airstream 107 entering the compressor section 105 may be significantly lower than the temperature of the components in the turbine section 150. This temperature difference may increase the thermal stress on those components. Reducing the volumetric flowrate of the compressor entering airstream 107 may reduce the thermal stress. This alternate embodiment of the present invention provides an airstream restrictor 215 that blocks some, or all, of the compressor entering airstream 107 entering the compressor section 105. This may reduce the volumetric flowrate. The airstream restrictor 215 may be connected to an area on the inlet 103 adjacent the upstream end of the compressor section 105. The airstream restrictor 215 may be integrated with any embodiment of the present invention including those illustrated in FIG. 1 or 2.

Another alternate embodiment of the present invention may comprise using an exhaust flow restrictor 215 (as illustrated in FIG. 2), in conjunction with the discharge system 170. While, the suction device 190 operates, ambient air may be drawn into the flow path 183 via the exhaust duct 167. This air may be at a significantly lower temperature than the components in the turbine section 150. This temperature difference may increase the thermal stress on those components. Reducing the volumetric flowrate of the entering airstream may reduce the thermal stress. This alternate embodiment of the present invention provides an exhaust flow restrictor 225 that blocks some, or all, of the air entering the flow path 183. This may reduce the volumetric flowrate. The exhaust flow restrictor 225 may be connected to an area on the exhaust duct 167, or an adjacent component, such as, but not limiting of, a stack, or a heat-recovery-steam-generator (not illustrated). The exhaust flow restrictor 225 may be integrated with any embodiment of the present invention including those illustrated in FIGS. 1-3.

Figure 3:
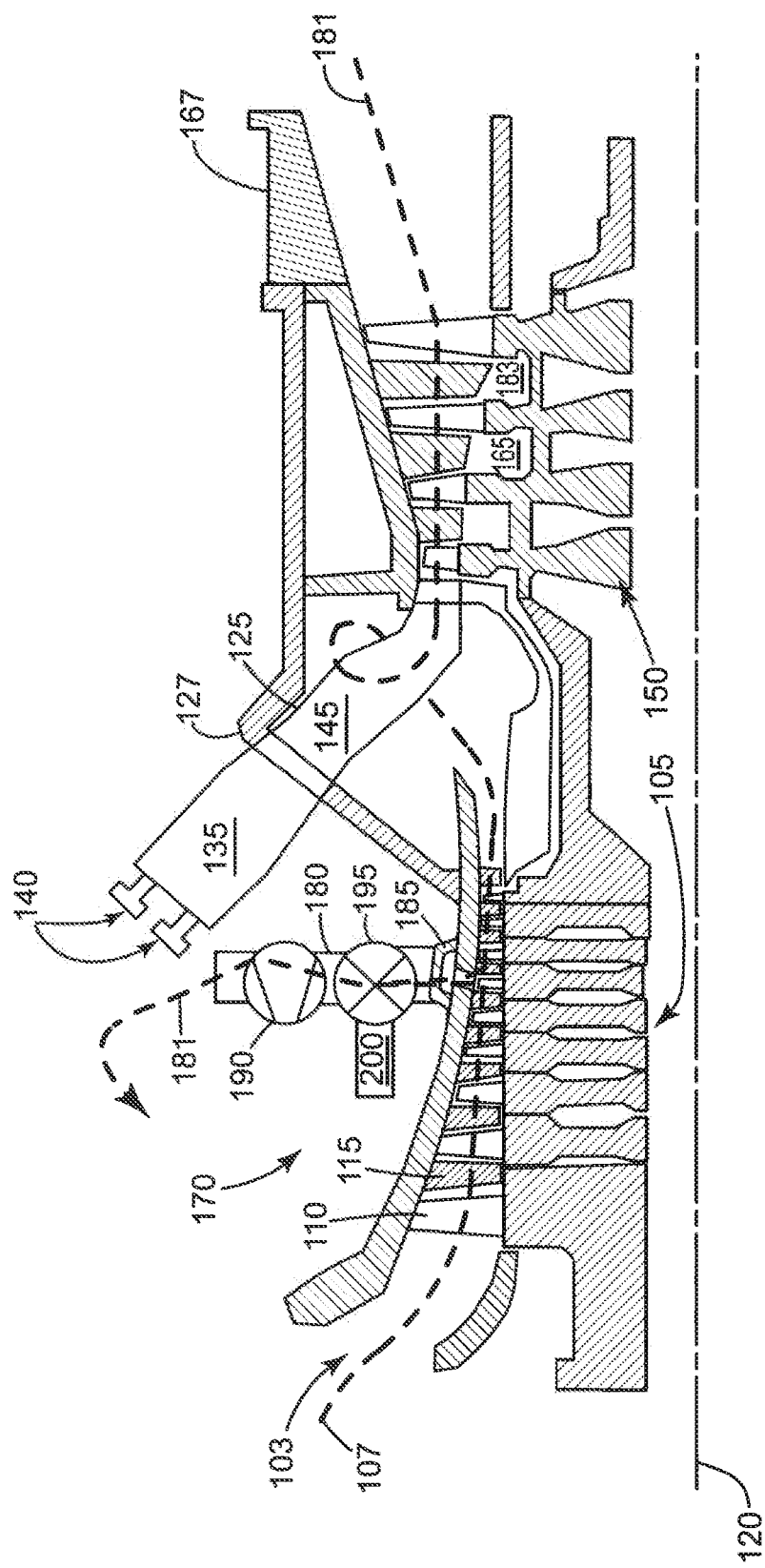
FIG. 3 is a schematic view, in partial cross-section, of a gas turbine, illustrating another alternate embodiment of the present invention.

FIG. 3 is a schematic view, in partial cross-section, of a gas turbine, illustrating another alternate embodiment of the present invention. The gas turbine 100 illustrated in FIG. 3 may be similar to the configurations in FIG. 2. The primary difference between the embodiments illustrated in FIG. 2 and FIG. 3 is the location of the multi-port valve 195.

As illustrated in FIG. 3, embodiments of the present invention may allow the multiport valve 195 to be mounted directly onto the extraction port 185 or the casing 125. Here, the suction device 190 may be directly mounted onto the multi-port valve 195. These features may eliminate the need for a discharge duct 180.

Embodiments of the present invention may provide an additional benefit removing remnants of combustibles gases from the gas turbine 100. As the discharge system 170 operates, the suction device 190 may remove these combustibles gases while drawing out the residual working fluid 181. This feature may significantly decrease other purging processes associated with the operation or maintenance of the gas turbine 100.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limiting of, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block.

The present invention may provide a control system 205, which has the technical effect of controlling the discharge system 170. The present invention may be configured to automatically operate after a combustion process has ended and the rotor 120 may stopped or rotating on turning gear, or the like.

Alternatively, the control system 205 may be configured to require a user action to initiate operation. An embodiment of the control system 205 may function as a stand-alone system. Alternatively, the control system 205 may be integrated as a module, or the like, within a broader system, such as, but is not limiting of, a turbomachine control system.

Figure 4:
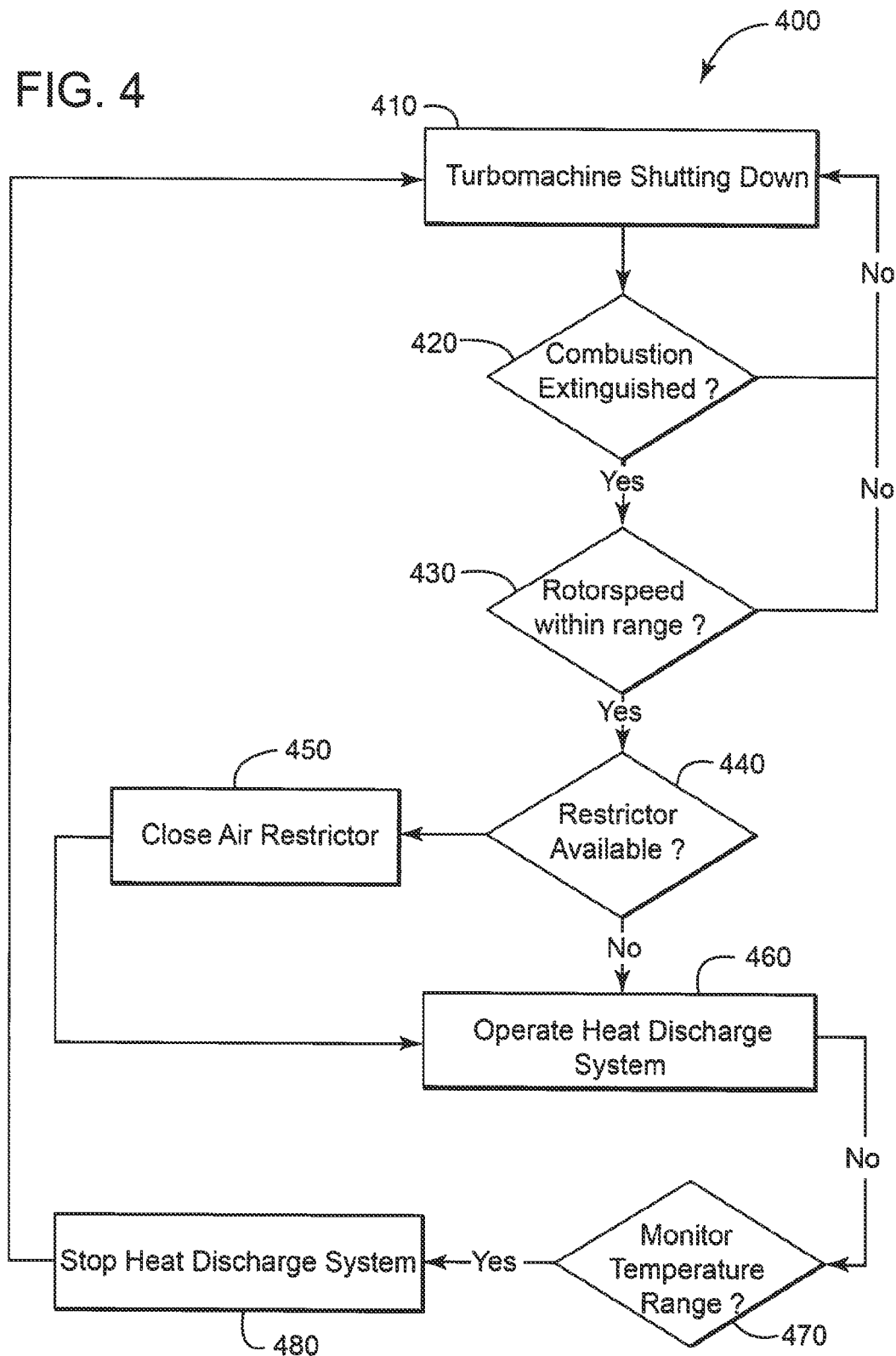
FIG. 4 illustrates a method of operating the discharge system of FIGS. 1-3, in accordance with embodiments of the present invention.

FIG. 4 illustrates a method of operating the discharge system 170 of FIGS. 1-2, in accordance with embodiments of the present invention.

In step 410, the method 400 may determine whether the turbomachine may be shutdown, or in the process of shutting down. Embodiments of the method 400 may be applied to the wide variety of turbomachines that produce a working fluid; such as, but not limiting of a gas turbine.

In step 420, the method 400 may determine if the combustion process associated with the gas turbine has extinguished. As discussed in relation to FIG. 1, the operation of the gas turbine includes a combustion process. This process ignites a mixture of the compressed airstream and a fuel; creating the working fluid. During a normal or fired shutdown, or a trip, of the gas turbine, the combustion process is extinguished. If the combustion process has extinguished then the method may proceed to step 430; otherwise the method may revert to step 410.

In step 430, the method 400 may determine if the speed of the rotor that supports the rotating components of the turbine section, is within a desirable range. During the shutdown, the speed of the rotor gradually decreases. To reduce the chance of bowing, the rotor is rotated at a very slow speed when the shutdown process is complete. For example, but not liming of, some rotors are rotated on turning gear at between roughly 2 to 5 RPM. Other rotors are rotated via a barring or ratcheting operation. If the rotorspeed is within the range, then the method 400 may proceed to step 440; otherwise the method 400 the method 400 may revert to step 410.

In step 440, the method 400 may determine if an airstream restrictor is available. As discussed, embodiments of the present invention may provide an airstream restrictor 215 located adjacent the inlet 103; and/or an exhaust stream restrictor 225 located adjacent the exhaust duct 167. This may reduce the thermal stress that may affect the components in the turbine section of the gas turbine. If the air restrictor is available, then the method 400 may proceed to step 450; otherwise the method 400 may proceed to step 460.

In step 450, the method 400 may operate the air restrictor in a manner that decreases the volumetric flowrate of the airstream. For example, but not limiting of, the air restrictor may comprise a fan-like form which may expand to cover the air-receiving end of the compressor section. Here, the method 400 in this step may expand the airstream restrictor.

In step 460, the method 400 may start the operation of the heat discharge system, as described. Here, the method 400 may control the discharge system in the manner as described in relation to FIG. 1, 2, or 3; depending on the configuration of the gas turbine.

In step 470, the method 400 may monitor a temperature range, or other parameter associated with the casing temperature. Essentially, this step determines whether operation of the method 400 may be in an open-loop or a closed-loop manner, as described. If a specific temperature or parameter may be monitored, then the method 400 may proceed to step 480 where closed-loop control may occur. Otherwise the method 400 may revert to step 460 where open-loop control may occur.

In step 480, the method 400 may stop the operation of the suction device if the monitored parameter is within a desired range. Then the method 400 may revert to step 410, wherein the method 400 may repeat.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

As one of ordinary skill in the art will appreciate, the many varying features and configurations described above in relation to the several embodiments may be further selectively applied to form other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A system comprising:
  a casing which encloses a rotating body that is rotated by a working fluid;
  wherein the casing comprises an upper half that covers an upper portion of the rotating body, and a lower half that covers a lower portion of the rotating body;
  a heat removal system that comprises a suction device and a discharge duct, wherein a first end of the discharge duct is connected to the upper half of the casing and a second end of the discharge duct is connected to the suction device;
  a flow path located between portions of the casing and the rotating body, wherein the working fluid flows within the flow path which engages the discharge duct;
  further comprising an extraction port located on the casing, wherein the discharge duct is connected to the extraction port;
  and, wherein the flow path engages the extraction port, allowing the residual working fluid to discharge through the extraction port;
  and further comprising a multi-way valve serially connected in the discharge duct between the extraction port and the suction device; and
  wherein the multi-way valve directs flow, exiting the extraction port, towards either the suction device or to a vent;
  a controller configured to after a combustion process ends, operate the suction device to replace the residual working fluid in the flow path with air.

2. The system of claim 1, wherein the suction device comprises at least one of: a blower, a fan, or a vacuum.

3. The system of claim 1, wherein the discharge system comprises a discharge port located on an outer surface of the casing, wherein the discharge duct is connected to the discharge port.

4. The system of claim 1 further comprising an airstream restrictor comprising a surface that is connected near an upstream end of a compressor, wherein the airstream restrictor reduces a quantity of an airstream ingested by a compressor.

5. The system of claim 1 further comprising a temperature detector connected to the casing, wherein the temperature detector measures a temperature of the casing.

6. The system of claim 1, wherein the rotating body comprises a compressor section and a turbine section, wherein both sections comprise rotating components mounted on a periphery of the rotating body.

7. The system of claim 6 further comprising a combustion section comprising components that combust a mixture of a compressed airstream and a fuel to create the working fluid.

8. The system of claim 7, wherein the casing encloses the compressor section, the turbine section, and the combustion section.

9. The system of claim 1, wherein the suction device removes combustibles from internal areas of the casing.

10. The system of claim 1 further comprising an exhaust flow restrictor comprising a surface that is connected near an exhaust duct, wherein the exhaust flow restrictor reduces a quantity of an airstream flowing upstream, through the exhaust duct, to the flow path.

11. A method comprising:
providing a gas turbine comprising:
an inlet section comprising components which receive an airstream;
a compressor section and a turbine section, which are mounted on a rotor, wherein rotating components of the compressor section and turbine section are mounted on a periphery of the rotor;
a combustion section comprising components which combusts a fuel and the airstream to create a working fluid that rotates the rotor; and
a casing that covers the rotor, wherein the casing comprises an upper half that encloses an upper portion of the rotor, and a lower half that encloses a lower portion of the rotor; and
a flow path located between the casing and the rotor, wherein the working fluid flows through the flow path;
providing a heat removal system that comprises a suction device and a discharge duct, wherein a first end of the discharge duct is connected to the upper half of the casing and engages the flow path, and a second end of the discharge duct is connected to the suction device; and
providing a control system comprising a processor that performs the steps of:
determining whether a combustion process is extinguished;
determining whether a speed of the rotor is within a range; and
operating the suction device to draw residual working fluid out of the flow path via the discharge duct;
wherein the casing comprises an extraction port which connects to the discharge port;
wherein the heat removal system comprises a multi-port valve serially connected in the discharge duct between the extraction port and the suction device;
further comprising operating the multi-port valve to direct the flow in the discharge duct towards either the suction device or towards a vent
wherein the suction device operatively replaces the residual working fluid with air.

12. The method of claim 11 further comprising the step of modulating an airstream restrictor to reduce the flowrate of the airstream entering the inlet.

13. The method of claim 11 further comprising the step of monitoring an associated parameter which is related to a temperature of the residual working fluid.

14. The method of claim 13 further comprising the step of stopping the heat removal system if the associated parameter is within a range.

15. The method of claim 13, wherein the associated parameter comprises at least one of: a wheelspace temperature; a temperature measured on a surface of the casing; a temperature of the residual working fluid discharged from the flow path; or chemical properties of the residual working fluid.

16. A system comprising:
a casing which encloses a rotating body that is rotated by a working fluid;
wherein the casing comprises an upper half that covers an upper portion of the rotating body, and a lower half that covers a lower portion of the rotating body;
a heat removal system that comprises a suction device integrated with the upper half of the casing;
a flow path located between portions of the casing and the rotating body, wherein the working fluid flows within the flow path which engages the discharge duct;
further comprising an extraction port located on the casing, wherein the suction device is connected to a downstream side of the extraction port;
wherein the flow path engages the extraction port, allowing the residual working fluid to discharge through the extraction port;
further comprising a multi-way valve serially connected between the extraction port and the suction device;
wherein the multi-way valve directs flow, exiting the extraction port, towards either the suction device or to a vent; and
a control system configured to after a combustion process ends, operate the suction device to draw residual working fluid out of the casing.

17. The system of claim 16, wherein the suction device is mounted directly on the casing.

* * * * *